July 9, 1935.  K. L. HERRMANN  2,007,194
ROLLER BEARING
Filed Oct. 12, 1933
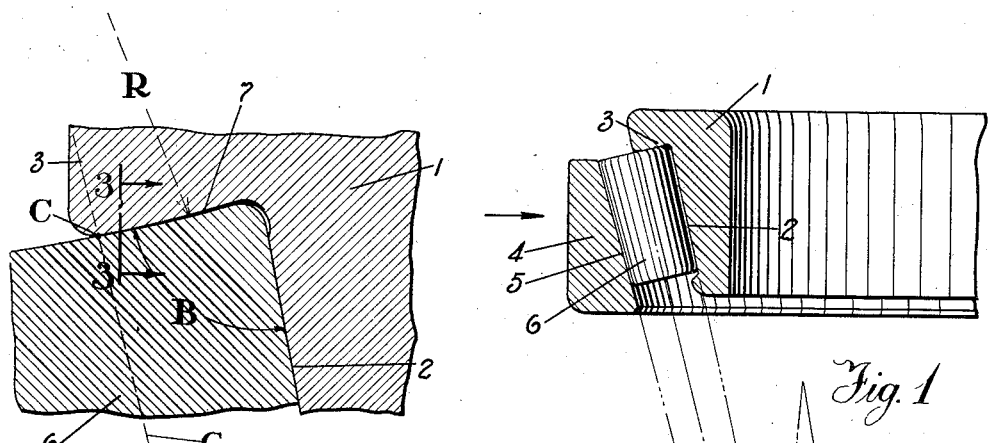
Fig. 1
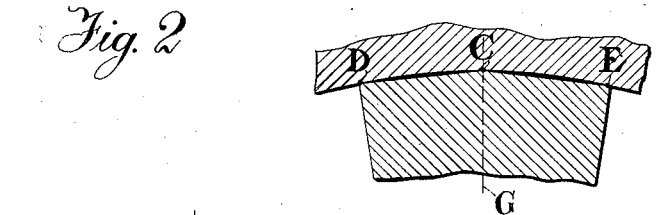
Fig. 2
Fig. 3
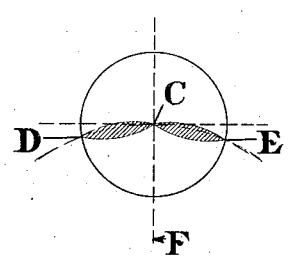
Fig. 5
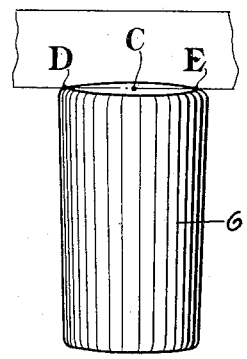
Fig. 4
INVENTOR.
BY Karl L. Herrmann
ATTORNEY Patented July 9, 1935

2,007,194

UNITED STATES PATENT OFFICE 2,007,194

ROLLER BEARING

Karl L. Herrmann, South Bend, Ind.

Application October 12, 1933, Serial No. 693,231

7 Claims. (Cl. 308—214)

The principal object of this invention is to provide an improved tapered roller bearing in which the rollers are maintained in their proper axial alignment to thus preserve the mathamatically correct rolling motion of the rollers relative to the race-ways.

A further object is to so form a shoulder or flange on one of the race members that the ends of each of the rollers contacting therewith will abut against the shoulder at three separated points, the central contact point taking the end thrust of the respective roller and the two other points aligning the roller to preserve its correct rolling motion relative to the race-ways.

A further object is to provide a reentrant curved shoulder on the inner race member against which the conical bases of each of the tapered rollers abut at three separated points, two of the contact points providing for sliding contact of the roller against the shoulder, and the third intermediate point providing pivotal contact only of the roller against the shoulder.

Another object is to provide a tapered roller bearing in which the contact between the thrust transmitting and guiding ends or bases of the rollers and adjacent face of the thrust resisting and guiding flange or shoulder formed on the inner race member is made at three separated points on each roller, one point being on the transverse axis of the roller extending radially of the bearing.

Another object is to provide a tapered roller bearing in which the contact between the thrust transmitting and guiding ends or bases of the rollers and adjacent face of the thrust resisting and guiding flange or shoulder formed on the inner race member is made at three separated points on each roller, one point of contact for each roller being at the intersection of its longitudinal axis and its transverse axis extending radially of the bearing.

Stated briefly and in general terms, my invention comprises an anti-friction bearing including an inner race member formed with a reentrant curved flange thereon, having its inner face shaped to contact with the thrust transmitting and guiding end of each tapered roller at three separated points, two of the points being adjacent to the opposite edges of the end face of the roller to maintain the correct rolling motion of the roller relative to the race members and the third point being on the transverse axis of the roller extending radially of the bearing to take the end thrust of the roller.

The above and other objects, and objects relating to details of construction and methods of manufacture will be apparent from the description to follow, and the accompanying drawing which illustrates one embodiment of the invention.

Heretofore there have been two types of tapered roller bearings constructed to provide for the alignment of the rollers relative to the race members. One of these designs provided for a single point contact on the end face of the roller against the flange on the inner race member. While this form eliminated some friction between the roller and flange, there was no means on the roller or raceway to provide for the alignment of the roller relative to the race members so that it was necessary or highly desirable to use roller retaining cages which again increased the friction and loss of the advantage of single point contact. Furthermore, this construction was not suitable for a full roller type bearing. The other design provided for a sliding contact of the end of the roller against the flange on the inner race member at two separated points adjacent to the opposite edges of the thrust transmitting end face of the roller. In this type of bearing, as the end face of the roller wears due to the sliding frictional contact with flange, the sliding point contact changes to frictional areas so that the advantage sought is largely lost.

A bearing manufactured in accordance with my present invention has the advantages of both of the types of bearings mentioned above without the disadvantages and objections inherent in each of them. It will be apparent that the contact point of the roller with the flange on the transverse axis of the roller extending radially of the bearing does not have the sliding frictional action encountered by the two separated contact points and as the end thrust of the roller is directed against this central contact point, the wear inherent in the type of bearing having the two separated contact points is largely eliminated. Also, because of the contact points at opposite sides of the central contact points, the roller is properly maintained with its mathematically correct direction of its axis relative to the race members.

Referring to the drawing in which like numerals refer to like parts throughout the several views, Fig. 1 is a sectional view showing parts of the inner and outer race members one roller interposed therebetween, but omitting a support for either of the race members.

Fig. 2 is an enlarged fragmentary sectional view better showing the relation of the roller to the inner race member.

Fig. 3 is an exaggerated sectional view taken substantially on the line 3—3 of Fig. 2, showing three separated points of contact between the end of the roller and the shoulder on the inner race member.

Fig. 4 is a view of the roller looking in the direction of the arrow of Fig. 1, showing further the three points of contact with the shoulder on the inner race member.

Fig. 5 is an end view of one of the rollers, showing the three points adapted to contact with the shoulder on the inner race member and the shaded portions showing the areas between the contact points.

Referring to the drawing, I have illustrated a bearing having an inner race member 1 provided with a conical roller bearing surface 2 and a reentrant curved shoulder 3 thereon, an outer race member 4 provided with a conical roller bearing surface 5 and conical or tapered rollers 6 interposed between the bearing surfaces 2 and 5. When assembled for use the conical surfaces 2 and 5 and the rollers 6 converge to the common point A. It is evident that under some conditions in use the rollers 6 will tend to back away from the point A so it is necessary or at least desirable to provide the shoulder 3 on the inner race member against which the outer ends of the rollers abut to maintain the rollers in properly engaged position between the race members.

While in the drawing I have not illustrated a complete bearing, it will be understood that I may employ either the full roller type or rollers spaced by a retainer or cage without in any way departing from the objects of my invention as the same contemplates a construction in which the base of each roller has contact at three separate points with a shoulder on one of the race members.

Irrespective of whether a retainer or cage is used to space the rollers or whether a full row of rollers is used, there is sufficient clearance between the rollers to allow their axes to deviate to a small extent from their correct direction of intersecting at a common point. When the roller shifts from its correct position, it then loses its elemental line contact with the bearing surfaces 2 and 5 on the race members 1 and 4 because the extended longitudinal axis of the rollers would not lie at the point A. To prevent or counteract the causes which might act to deviate the rollers from the above-described correct direction of their axes, I have provided a construction which will permit the true rolling motion of the rollers relative to the race members without friction losses inherent in many types of bearings and without apparent wear over a long period of time of the rollers and race members.

I preferably form the curved reentrant shoulder 3 of the race member 1 on an arc 7 generated from a predetermined radius as indicated by the broken line R on Fig. 2. Also the end face of each roller is preferably formed to a slightly conical shape and to a suitable angle relative the side face thereof, as indicated by B in Fig. 2, so that the roller has contact with the shoulder at a point C midway between the bearing faces of the roller on its transverse axis extending radially of the bearing, as indicated by the line F of Fig. 5, and also at the points D and E adjacent to the edges of the end face thereof thus providing a three-point contact for each roller against the curved face 7 of the shoulder 3, whereby the rollers 6 are maintained in their mathematically correct position with their extended axes terminating at the common point A. While the end of the roller 6 is slightly conical, the arc is generated from a different center than the inner face of the reentrant shoulder 3 so that the end of the roller 6 between the contact points D and C and between the points C and E is out of contact with the shoulder, thus as the roller rotates and bears against the shoulder 3, a three point contact therewith is present at all times. If desired the shoulder 3 may be of sufficient depth so that the point C will fall on the longitudinal axis G of the roller; that is, at the intersection of the longitudinal axis G and the transverse axis F extending radially of the bearing. When the shoulder is formed of such depth that the bearing point C is at the intersection of the longitudinal and transverse axis G and F of the roller, it will be apparent that the roller will have a true pivotal contact with the curved face 7 of the shoulder 3 at the point C, thus eliminating any friction or sliding of the roller relative to the race member at that point, and that the contact points D and E will function to maintain the roller in correct axial alignment relative to the race-ways.

As the end thrust of the respective rollers is exerted directly against the contact point C which is a true pivotal point of contact, relatively little wear of the rollers and curved face on the shoulder will occur, thus providing a bearing having long life and a minimum of friction. When the shoulder 3 is formed of a lesser depth than that just described so that the contact point C falls outside of the longitudinal axis of the roller, even then there will be very little sliding action of the roller relative to the curved face on the shoulder at that point and the friction between the respective parts is materially less than the friction produced in the bearings now in commercial use.

After long use should be contact points C, D and E wear to any extent, the purpose and objects of my invention will not be lost because even then there will be three distinct areas of contact between the end faces of the rollers and shoulder maintaining each of the rollers in the correct position. As it is desirable to provide the correct mathematical three-point contact of each roller with the shoulder, I preferably lap the rollers in the bearing after the same have been ground, although such practice may not always be necessary provided all of the respective parts are properly ground.

While I have illustrated and described a preferred embodiment of my invention, it is to be understood that detailed changes may be made without departing from the spirit and scope thereof, and my invention is to be limited only by the subjoined claims.

What I claim is:

1. A roller bearing comprising, an inner race member having a conical bearing surface and a fixed reentrant thrust shoulder thereon, an outer race member having a conical bearing surface, and tapered rollers interposed between said bearing surfaces having their conical bases abutting against said reentrant shoulder at three separated points, one of said contact points of each roller being on the longitudinal axis of said roller.

2. A roller bearing comprising, an inner race member having a conical bearing surface and a fixed reentrant thrust shoulder thereon, an outer race member having a conical bearing surface, and tapered rollers interposed between said bearing surfaces having their conical bases abutting against said shoulder at three substantially equally spaced points, one of said contact points of each roller being at the intersection of the longitudinal and transverse axes of said roller.

3. A roller bearing comprising, an inner race member having a conical bearing surface and a fixed reentrant curved thrust shoulder thereon, the curve being generated from a point outside of said bearing, an outer race member having a conical bearing surface, and tapered rollers interposed between said bearing surfaces having their conical bases abutting against said curved shoulder at three separated and substantially equal spaced points, one of said contact points of each roller being on the longitudinal axis of said roller.

4. A roller bearing comprising, inner and outer race members each having a conical bearing surface, one of said race members also having a reentrant curved shoulder thereon, and tapered rollers interposed between said bearing surfaces, each roller having its conical base abutting against said shoulder at a point on the transverse axis of the roller extending radially of the bearing and at points adjacent to the edges of the base of the roller to thus provide a three-point contact against said shoulder.

5. A roller bearing comprising, inner and outer race members each having a conical bearing surface, one of said race members also having a reentrant curved shoulder thereon, and tapered rollers interposed between said bearing surfaces, each roller having its conical base abutting against said shoulder at a point at the intersection of the longitudinal axis and the transverse axis of the roller extending radially of the bearing and at points adjacent to opposite edges of the base of the roller to thus provide a three-point contact against said shoulder.

6. A roller bearing comprising, an inner race member having a conical bearing surface and a fixed thrust shoulder, an outer race member having a conical bearing surface, and tapered rollers interposed between said bearing surfaces, each roller having its base abutting against said shoulder at three separated and substantially equal spaced points, one of said points being at the intersection of the longitudinal and transverse axes of the roller.

7. A roller bearing comprising, an inner race member having a conical bearing surface and a fixed reentrant curved thrust shoulder thereon, the curve being generated from a point outside of said bearing, an outer race member having a conical bearing surface, and tapered rollers interposed between said bearing surfaces, each roller having a conical base abutting against said shoulder at three substantially equally spaced points, one of said points having pivotal contact only with said shoulder, and positioned to take the end thrust of said roller against said shoulder and the other two of said contact points aligning said roller in axial alignment relative to said race members.

KARL L. HERRMANN.